J. P. SPACEK.
VEGETABLE CUTTER.
APPLICATION FILED DEC. 19, 1907.

925,663.

Patented June 22, 1909.
4 SHEETS—SHEET 1.

Witnesses
C. R. Reichenbach.
Geo. W. Suss.

Inventor
J. P. Spacek.
By Chandler & Chandler
Attorneys

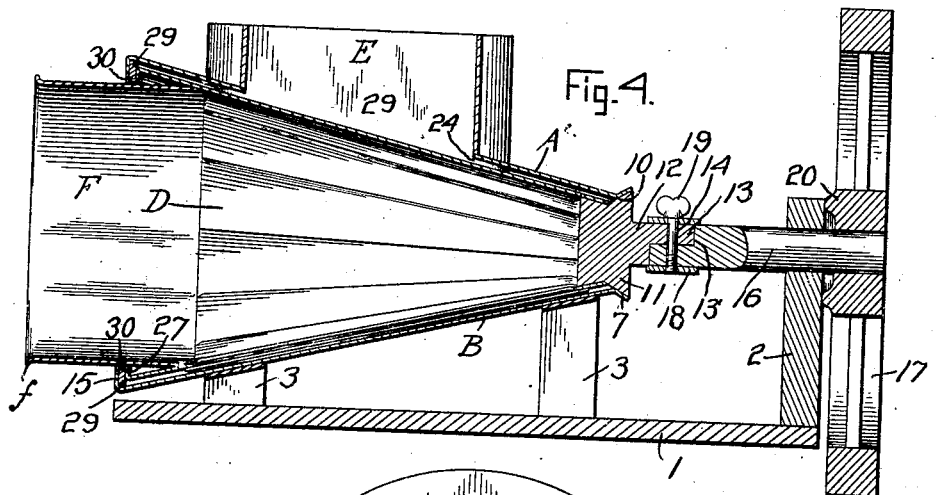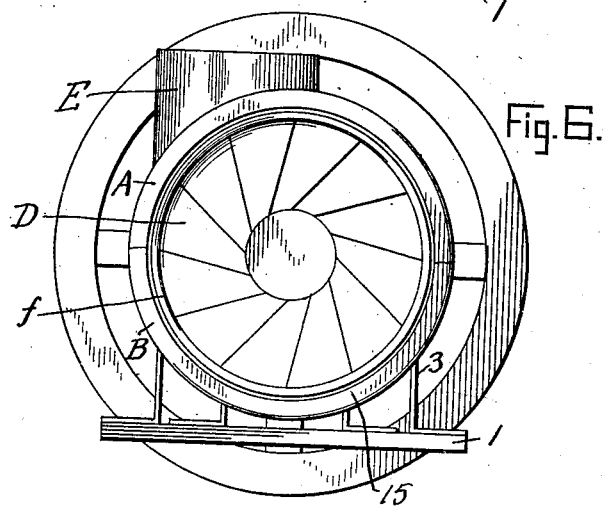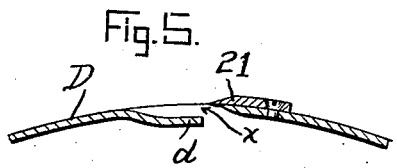

J. P. SPACEK.
VEGETABLE CUTTER.
APPLICATION FILED DEC. 19, 1907.
925,663.
Patented June 22, 1909.
4 SHEETS—SHEET 3.
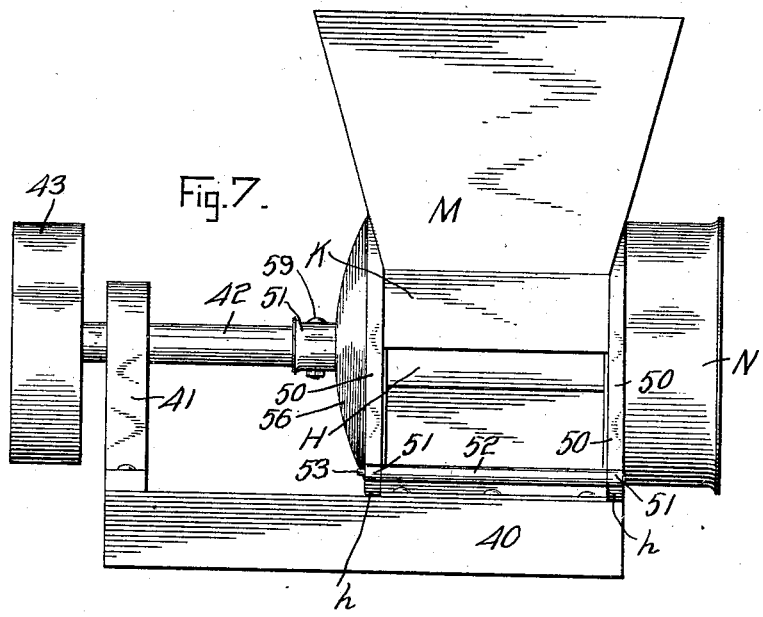
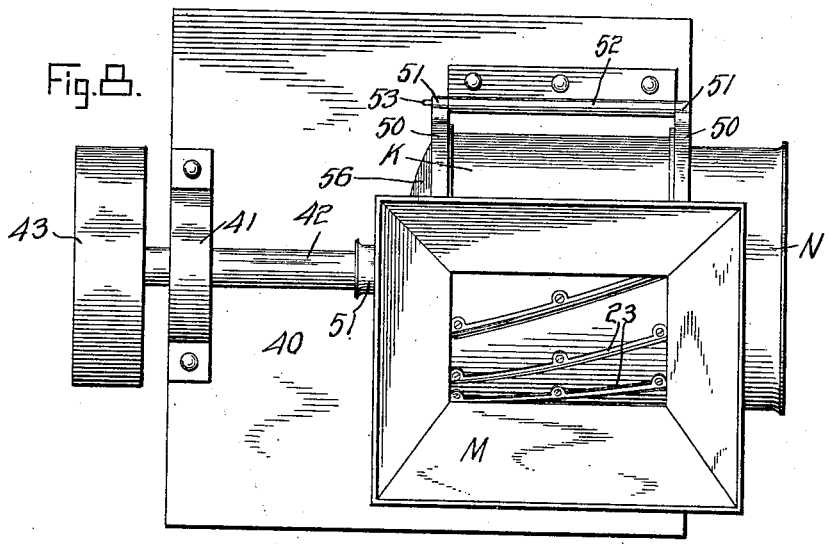

J. P. SPACEK.
VEGETABLE CUTTER.
APPLICATION FILED DEC. 19, 1907.
925,663.
Patented June 22, 1909.
4 SHEETS—SHEET 4.
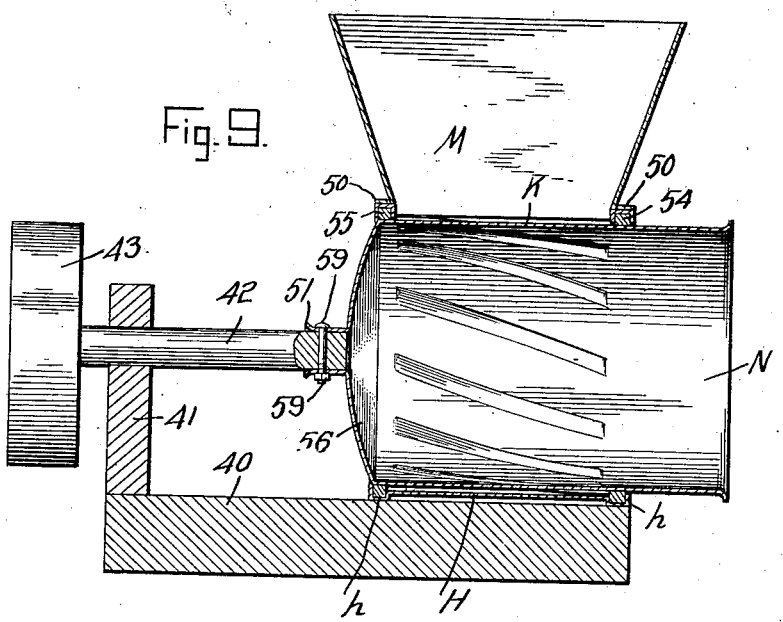
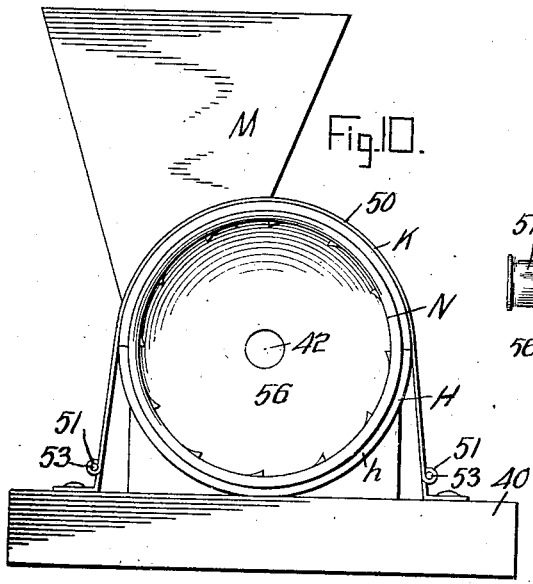
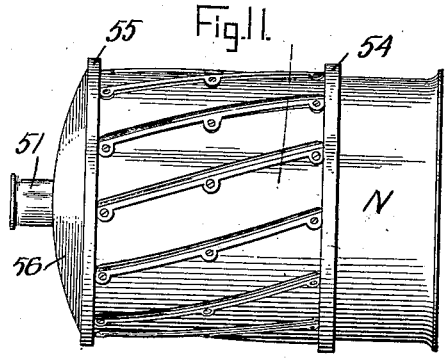
Witnesses
C. K. Reichenbach.
Geo. W. Sues.
Inventor
J. P. Spacek.
By Brandalert Brandalert
Attorneys.
THE NORRIS PETERS CO., WASHINGTON, D. C.

UNITED STATES PATENT OFFICE.

JOSEPH P. SPACEK, OF DIME BOX, TEXAS.

VEGETABLE-CUTTER.

No. 925,663.      Specification of Letters Patent.      Patented June 22, 1909.

Application filed December 19, 1907. Serial No. 407,218.

*To all whom it may concern:*

Be it known that I, JOSEPH P. SPACEK, a citizen of the United States, residing at Dime Box, in the county of Lee, State of Texas, have invented certain new and useful Improvements in Vegetable-Cutters; and I do hereby declare the following to be a full, clear, and exact description of the invention, such as will enable others skilled in the art to which it appertains to make and use the same.

This invention relates to a new and useful improvement in vegetable cutters.

The object of my invention is to provide a simple, efficient vegetable cutter relating to that class known as kraut cutters and comprises a hollow rotatably held cutting cone held within a suitable housing which may be readily opened so that the cutting mechanism may be cleaned and the cutter is self emptying and comprises certain other arrangements described more fully hereinafter.

Figure 1:
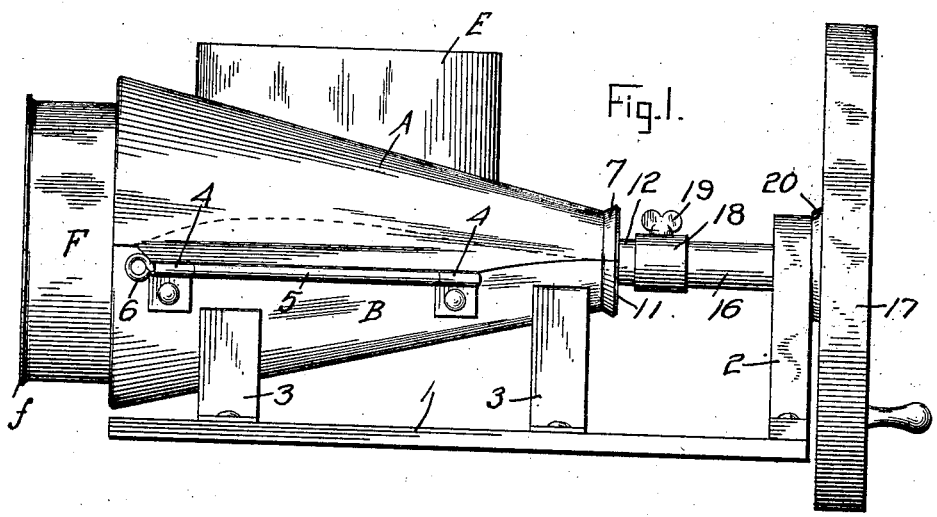
Figure 2:
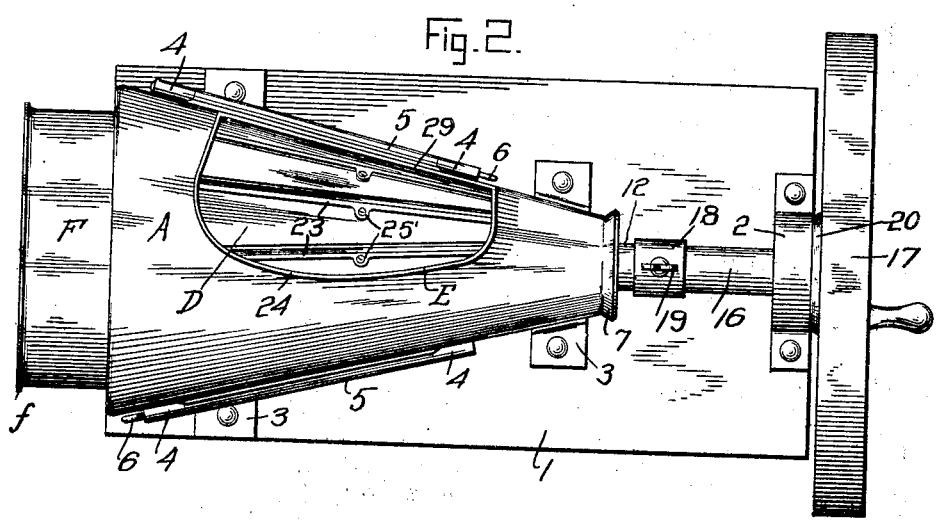
Figure 3:
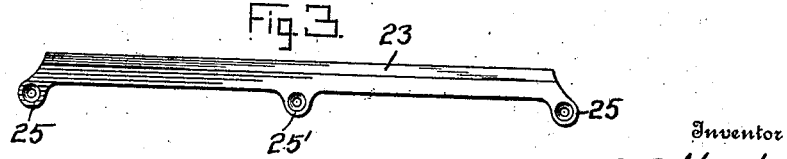

In the accompanying drawings I have shown in Figure 1 a side elevation of a cutter embodying my invention. Fig. 2 is a top view of my vegetable cutter. Fig. 3 shows a detached detail of one of the cutter knives. Fig. 4 shows a detached sectional detail of the cutting cone. Fig. 5 shows an enlarged broken detached view disclosing the arrangement of the knife in connection with the cutting cone. Fig. 6 shows an end view of my vegetable cutter. Fig. 7 shows a side elevation of a modification of my invention. Fig. 8 shows a top view of said modification. Fig. 9 discloses a sectional view of Fig. 7. Fig. 10 shows an end view of the lower casing section as used in my invention in the modification, and, Fig. 11 shows a detached detail of the cutting cylinder as used in my modification.

In that class of inventions known as kraut cutters it is desirable to have a machine adapted to finely cut the cabbage and arranged so that all the parts of the cutter are accessible so that it may be cleaned and dried to keep the cutting mechanism in a sanitary condition.

In carrying out the object of my invention, I use a suitable supporting base 1 which at one end is provided with the upwardly projecting bearing 2. Secured to this base 1 by means of four supporting legs 3 is a casing or housing made cone-shaped as shown in Figs. 1 and 2 and this casing is made of two sheet metal shells, the upper shell A being hinged to the lower shell B. These hinges are in the form of the ears 4 as shown in Fig. 1 secured to the lower casing member or shell B and the sleeve 5 secured to the upper casing member or shell, this sleeve 5 being held between the ears 4 as shown and inserted within the collar and ears is a suitable pin 6 so that on the removal of the two pins the top of the casing may be removed from the bottom portion. If desired but one of the pins 6 may be removed, the other then working as a hinge. Each of these cone-shaped casing members or shells is provided with a flared collar 7 at one end as shown in Figs. 1 and 4 to snugly engage the inner cone face 10 of the hub 11. This hub is provided with a stub-shaft 12 having the offset or shoulder 13 and being perforated at 14 as shown in Fig. 4.

The casing B is provided at its enlarged end with an inwardly turned flange 15 shown in detail in Fig. 4 while the upper end 7 of the casing B, as shown in Fig. 4 is flared out. Held within the bearing 2 is a drive shaft 16 having a handle-provided fly wheel 17 and this drive shaft 16 as shown is also perforated and provided with an offset 13' and this drive shaft is adapted to be brought into engagement with the shoulder-provided stub-shaft 12 and encompassed by a collar 18 which is perforated to receive a suitable thumb screw 19 as shown in Fig. 4 so that the cutter hub 11 may be fixed to the drive shaft as shown. There is sufficient space provided between the shaft perforation and the bearing 2 so that the collar 18 may be shoved toward this bearing 2 when the drive shaft is to be disconnected from the cutter cone. The outer face of the bearing 2 is smooth and the fly wheel 17 is provided with a bearing flange 20 adapted to be brought into engagement with the flat surface of the bearing 2 as shown in Fig. 1.

The cutter cone used in my invention is preferably made of sheet steel and has a number of knives 21 detachably mounted thereon, preferably twelve in number and secured to its outer peripheral surface. In Fig. 2 one of the knives 23 may be seen through the hopper opening a top view of one of the knives being shown in Fig. 3. These knives have the terminal perforated ears 25 and an intermediate ear 25' through which suitable screws are inserted threading into the drum D to properly hold these knives.

The drum D at suitable points is slotted and a portion of the metal is upset inward as shown in detail in Fig. 5 to provide the feed openings as indicated by the arrow x in said figure and it is adjacent this inwardly upset portion d that the knives 23 are positioned. Secured to the enlarged end of the cutter cone D as more clearly shown in Fig. 4 is a spout F in the form of a cylinder which rests upon the inwardly turned elbow portion 27 of the cone D and secured to the elbow 27 which is in the form of an annular flange is a bearing ring or annulus 29 secured by means of suitable rivets 30, and this bearing ring 29 is adapted to rest against the inner face of the casing flange 15 as shown in said Fig. 4. This ring 29 supports the cutting cone at its enlarged end while at the smaller end the cutting cone is supported by means of the hub 11 resting upon the bearing collar 7 and also being held and guided by means of the stub shaft 12.

In Fig. 4, I have shown a sectional view of the cutting cone disclosing the connected hub and spout F which is flanged at its outer end as is shown at f. The upper housing A at a suitable point is provided with a hopper E which is straight along one edge as shown at 29 and curved along its opposite edge and it is against the straight edge of the hopper that the cabbage is held in being sliced.

The operation of slicing cabbage by means of my cutter is extremely simple. The fly wheel 17 is rotated to impart a proper speed to the knife provided cutting cone when the cabbage is introduced into the hopper and gently pressed downward by the operator. The vegetable is then sliced and after being cut drops through the feed opening x into the cone and hitting the inclined inner face of this cone, the cabbage gravitates toward the emptying end of the cutter where it may be collected in a suitable vessel. The knives 23 are secured by screws, 25', and may be readily removed or replaced and in cleaning the cutter the top is removed from the bottom when the cutting cone is removed from the shaft so that the lower half of the casing may be cleaned and dried while the cone then may also be cleaned, both externally and upon the inside to keep the same in a sanitary condition.

In Figs. 7 and 9 I have disclosed a modification in which I use a base 40 having the bearing 41 within which is held a shaft 42 having a drive pulley 43. Upon this base plate is held the lower shell H forming the lower half of the casing or housing as used in this modification. This housing H at each end is provided with a bearing groove h as shown in Fig. 9. In connection with this lower housing or case section, H, I use a counterpart casing K which is also provided with a bearing groove at each end. The upper case portion K is provided with a hopper M and is secured to the lower case section H by means of the straps 50, these straps having terminal eyes 51 while to the base is secured a sleeve 52, a pin 53 fastening through the eyes and sleeve 52 as shown. Two such pins 52 are used so that the upper casing may be detached from the lower. The cutter in this modification is in the form of a cylinder instead of a cone and is provided with the forward bearing ring 54 and the rear bearing ring 55 adapted to work within the grooves h. This cylinder is closed at one end by means of the dished disk 56 shown in Fig. 9 from which extends a perforated collar 51 which is adapted to engage about and contain the shaft 42, a pin 59 as shown in Fig. 9 connecting the shaft to the cutting cylinder. In this modification the device is operated exactly as where the cone-shaped knife holder is used and may also be taken apart to be cleaned.

And having thus described my said invention what I claim as new is—

In a vegetable cutter, a stationary casing provided with a lateral extension having an inwardly turned flange, a second lateral extension outwardly disposed with reference to said casing, a revoluble knife supporting case held in said extensions and having the end in the first mentioned extension provided with an inwardly turned flange, a bearing ring secured to the last mentioned flange and resting within the extension against the first mentioned flange and a discharge spout supported on the knife supporting case and said bearing ring.

In testimony whereof, I affix my signature, in presence of two witnesses.

JOSEPH P. SPACEK.

Witnesses:
T. H. SKRABANEK,
GEO. M. JOHNSTON.